United States Patent
Kanazawa

(10) Patent No.: US 10,884,684 B1
(45) Date of Patent: Jan. 5, 2021

(54) IMAGE FORMING APPARATUS, IMAGE FORMING METHOD, AND NON-TRANSITORY COMPUTER READABLE RECORDING MEDIUM

(71) Applicant: KYOCERA DOCUMENT SOLUTIONS INC., Osaka (JP)

(72) Inventor: Keizen Kanazawa, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/568,752

(22) Filed: Sep. 12, 2019

(51) Int. Cl.
*G06F 15/00* (2006.01)
*G06K 1/00* (2006.01)
*G06K 15/02* (2006.01)
*G06F 3/12* (2006.01)

(52) U.S. Cl.
CPC .......... *G06F 3/1239* (2013.01); *G06F 3/1206* (2013.01); *G06F 3/1254* (2013.01); *G06K 15/1831* (2013.01)

(58) Field of Classification Search
CPC .... G06F 3/1239; G06F 3/1206; G06F 3/1254; G06K 15/1831
USPC ........................................ 358/1.11, 1.1, 1.13
See application file for complete search history.

(56) References Cited

U.S. PATENT DOCUMENTS

| | | | |
|---|---|---|---|
| 2005/0169686 A1* | 8/2005 | Shimamura | G06K 15/02 400/76 |
| 2011/0063671 A1* | 3/2011 | Akahane | G06K 15/1827 358/1.15 |
| 2017/0147535 A1* | 5/2017 | Cao | G06F 40/109 |

FOREIGN PATENT DOCUMENTS

JP 2016047606 A 4/2016

* cited by examiner

*Primary Examiner* — Douglas Q Tran
(74) *Attorney, Agent, or Firm* — Li & Cai Intellectual Property (USA) Office

(57) ABSTRACT

An image forming apparatus includes a controller circuit configured to execute an information processing program to operate as a rendering module, the rendering module being configured to determine whether or not a specified font is included in the list, the specified font being a font specified by the font specifying information, if determining that the specified font is not included in the list, select an alternative font from the list, the alternative font being one of the one or more fonts, render a character specified by the character code included in the printable data by using alternative font data, the alternative font data being font data of the alternative font, and render alternative font rendering information, the alternative font rendering information being information indicating that rendering is executed by using the alternative font data.

16 Claims, 4 Drawing Sheets

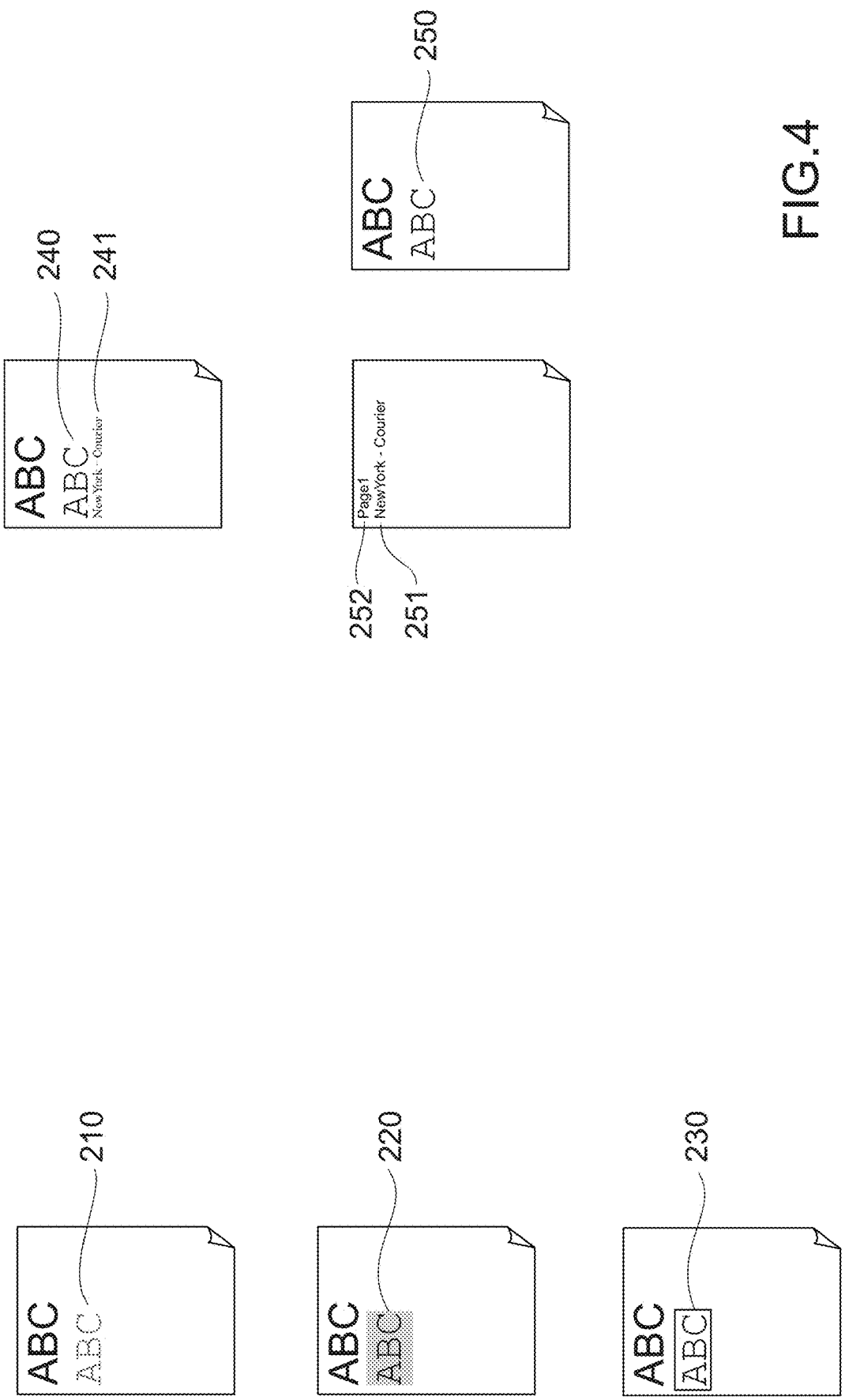

IMAGE FORMING APPARATUS, IMAGE FORMING METHOD, AND NON-TRANSITORY COMPUTER READABLE RECORDING MEDIUM

FIELD OF THE DISCLOSURE

The present disclosure relates to an image forming apparatus that renders characters specified by character codes in printable data, an image forming method, and a non-transitory computer readable recording medium that records an information processing program.

BACKGROUND OF THE DISCLOSURE

There is known an image forming apparatus that renders characters specified by character codes in printable data received from a host device by using a font specified in the printable data.

SUMMARY OF THE DISCLOSURE

According to an embodiment of the present disclosure, there is provided an image forming apparatus, including:

a memory configured to store font data of each of one or more fonts, and a list including the one or more fonts;

a communication interface configured to receive printable data from a host device, the printable data including font specifying information and a character code; and a controller circuit configured to execute an information processing program to operate as a rendering module, the rendering module being configured to determine whether or not a specified font is included in the list, the specified font being a font specified by the font specifying information, if determining that the specified font is not included in the list, select an alternative font from the list, the alternative font being one of the one or more fonts, render a character specified by the character code included in the printable data by using alternative font data, the alternative font data being font data of the alternative font, and render alternative font rendering information, the alternative font rendering information being information indicating that rendering is executed by using the alternative font data.

According to an embodiment of the present disclosure, there is provided an image forming method for an image forming apparatus including a memory configured to store font data of each of one or more fonts, and a list including the one or more fonts, a communication interface configured to receive printable data from a host device, the printable data including font specifying information and a character code, and a controller circuit configured to execute an information processing program to operate as a rendering module, the image forming method including:

by the rendering module of the image forming apparatus, determining whether or not a specified font is included in the list, the specified font being a font specified by the font specifying information;

if determining that the specified font is not included in the list, selecting an alternative font from the list, the alternative font being one of the one or more fonts;

rendering a character specified by the character code included in the printable data by using alternative font data, the alternative font data being font data of the alternative font; and rendering alternative font rendering information, the alternative font rendering information being information indicating that rendering is executed by using the alternative font data.

According to an embodiment of the present disclosure, there is provided a non-transitory computer readable recording medium that records an information processing program executable by an image forming apparatus including a memory configured to store font data of each of one or more fonts, and a list including the one or more fonts, a communication interface configured to receive printable data from a host device, the printable data including font specifying information and a character code, and a controller circuit configured to execute an information processing program to operate as a rendering module, the information processing program causing the controller circuit of the image forming apparatus to operate as a rendering module, the rendering module being configured to determine whether or not a specified font is included in the list, the specified font being a font specified by the font specifying information, if determining that the specified font is not included in the list, select an alternative font from the list, the alternative font being one of the one or more fonts, render a character specified by the character code included in the printable data by using alternative font data, the alternative font data being font data of the alternative font, and render alternative font rendering information, the alternative font rendering information being information indicating that rendering is executed by using the alternative font data.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 4 shows examples of alternative font rendering information that is rendered.

DETAILED DESCRIPTION OF THE EXEMPLARY EMBODIMENTS

Hereinafter, an embodiment of the present disclosure will be described with reference to the drawings.

1. Hardware Configuration of Image Forming Apparatus

Figure 1:
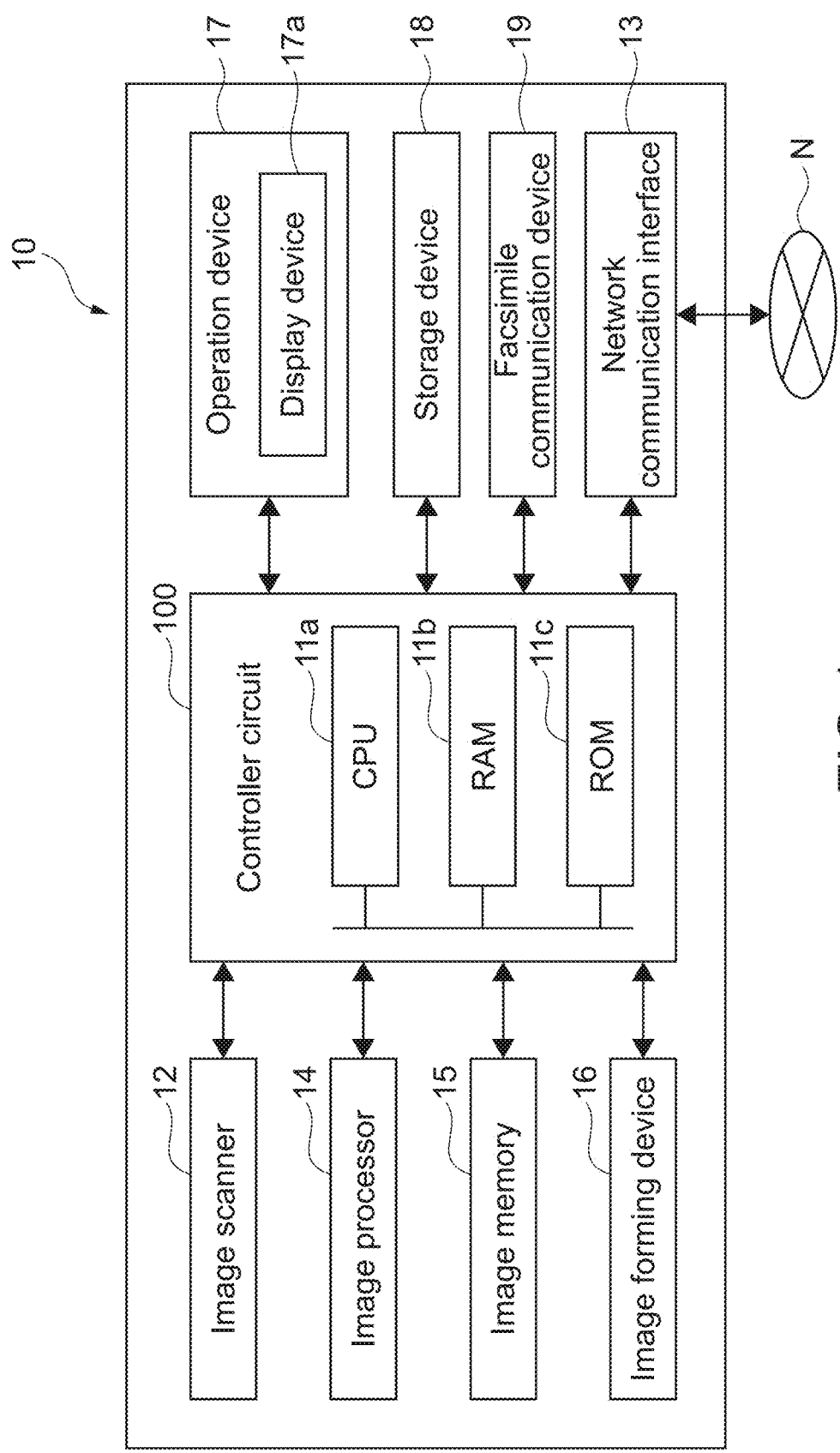
FIG. 1 shows a hardware configuration of an image forming apparatus of an embodiment of the present disclosure.

FIG. 1 shows a hardware configuration of an image forming apparatus according to an embodiment of the present disclosure.

The image forming apparatus 10 includes the controller circuit 100. The controller circuit 100 includes the CPU (Central Processing Unit) 11a (processor), the RAM (Random Access Memory) 11b, the ROM (Read Only Memory) 11c (memory), dedicated hardware circuits, and the like and performs overall operational control of the image forming apparatus 10. The CPU 11a loads information processing programs (including image processing program) stored in the ROM 11c in the RAM 11b and executes the information processing programs. The nonvolatile ROM 11c stores information processing programs executed by the CPU 11a and data. The ROM 11c is an example of a non-transitory computer readable recording medium.

The controller circuit 100 is connected to the image scanner 12, the image processor 14 (including GPU (Graphics Processing Unit)), the image memory 15, the image forming device 16 (printer), the operation device 17 including the display device 17a (touch panel), the large-volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 including the display device 17a (touch panel) is an embodiment of an input device. A sound input device including a microphone may be provided as an input device.

2. Functional Configuration of Image Forming Apparatus

Figure 2:
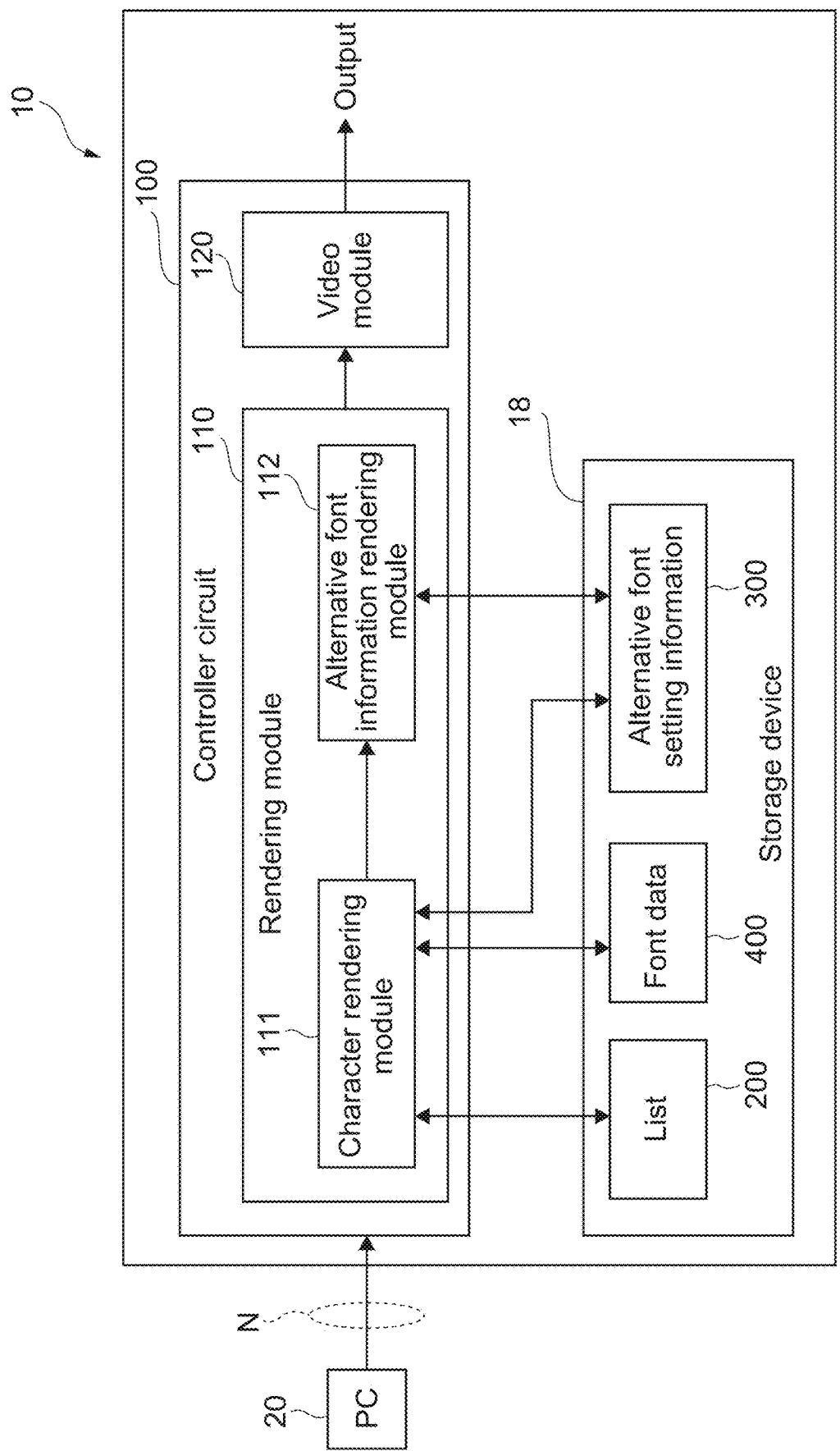
FIG. 2 shows a functional configuration of the image forming apparatus.

FIG. 2 shows a functional configuration of the image forming apparatus.

In the controller circuit 100 of the image forming apparatus 10, the CPU 11a loads an image processing program stored in the ROM 11c in the RAM 11b and executes the image processing program to thereby operate as the rendering module 110 and the video module 120.

The rendering module 110 is an interpreter that interprets printable data received from the host device 20 via the network communication interface 13, and renders characters on a basis of the printable data. The rendering module 110 includes the character rendering module 111 and the alternative font information rendering module 112.

The character rendering module 111 selects a font and a rendering attribute on a basis of the printable data, and renders characters.

The alternative font information rendering module 112 renders, if the character rendering module 111 renders characters by using an alternative font, alternative font rendering information, which is information indicating that.

The video module 120 forms images of characters on paper on a basis of the bitmap data obtained from the rendering module 110.

The storage device 18 stores the list 200, the font data 400, and the alternative font setting information 300.

The font data 400 is resident font data (for example, font data of Arial font, font data of Courier font, etc.) used to render each of one or more fonts.

The list 200 is a list of the one or more fonts.

The alternative font setting information 300 sets alternative font rendering information. The alternative font rendering information is information indicating that characters are rendered by using an alternative font by the character rendering module 111.

3. Operational Flow of Rendering Module

Figure 3:
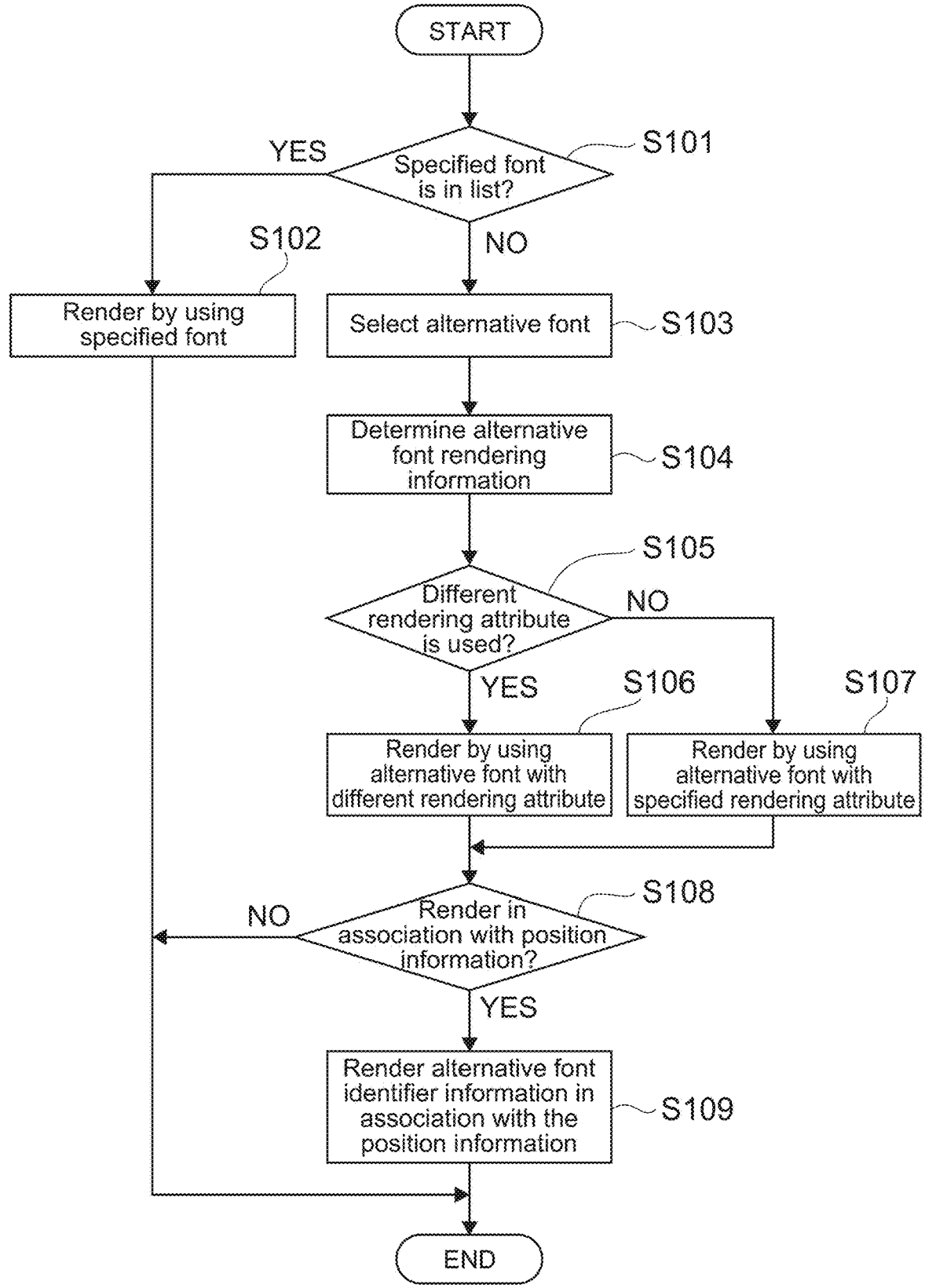
FIG. 3 shows an operational flow of the rendering module.

FIG. 3 shows an operational flow of rendering module.

The image forming apparatus 10 receives printable data from the host device 20 connected to the network N via the network communication interface 13. The printable data is described in, for example, PDL (Page Description Language). The printable data includes font specifying information and character codes. The font specifying information is information specifying a font (Arial, New York, etc.) to be output. The printable data further includes a rendering attribute (character color, background color (highlight), font size, italics, boldface, etc.). The printable data may specify one type of font or two or more types of fonts. If the printable data specifies two or more types of fonts, the rendering module 110 executes the operational flow for each font.

The character rendering module 111 of the rendering module 110 determines, with reference to the character code table 200, whether or not the font specified by the font specifying information in the printable data (hereinafter referred to as specified font) is included in the list 200 (Step S101).

The character rendering module 111 of the rendering module 110 determines that the specified font is included in the list 200 (Step S101, YES). In this case, the character rendering module 111 of the rendering module 110 renders the characters specified by the character codes included in the printable data by using the specified font (Step S102). Specifically, the character rendering module 111 of the rendering module 110 renders the characters specified by the character codes included in the printable data by using the font data 400 of the specified font, and thereby generates rendering data (bitmap data). The character rendering module 111 of the rendering module 110 outputs the generated rendering data (bitmap data) to the video module 120.

Meanwhile, the character rendering module 111 of the rendering module 110 determines that the specified font is not included in the list 200 (Step S101, NO).

In this case, the character rendering module 111 of the rendering module 110 selects one font (referred to as alternative font) out of the one or more fonts included in the list 200 (Step S103).

With reference to the alternative font setting information 300, the character rendering module 111 of the rendering module 110 determines alternative font rendering information (i.e., information indicating that rendering is executed by using alternative font data) to be rendered (Step S104). Specifically, the alternative font setting information 300 includes one of the following alternative font rendering information (1) to (6), for example. The character rendering module 111 of the rendering module 110 determines the font rendering information (i.e., one of (1) to (6)) set in the alternative font setting information 300.

(1) Characters are rendered by using alternative font data with a rendering attribute (for example, character color, background color, character surrounding) different from the specified rendering attribute (i.e., rendering attribute included in printable data).

(2) Information identifying the alternative font (alternative font identifier information) is rendered in association with the information (position information) indicating the position of the characters rendered by using the alternative font data. Specifically, alternative font identifier information (for example, the font name of the specified font, and the font name of the alternative font) is rendered near (i.e., position information) the characters rendered by using the alternative font data.

(3) Information identifying the alternative font (alternative font identifier information) is rendered in association with the information (position information) indicating the position of the characters rendered by using the alternative font data. Specifically, a page image of a summary page is generated. The summary page includes alternative font identifier information (for example, the font name of the specified font, and the font name of the alternative font), and character information (i.e., position information) indicating the position of the characters (for example, page number of the page including the characters). The generated page image is rendered.

(4) The combination of two or all of the aforementioned (1), (2), and (3).

(5) Alternative font rendering information to be rendered is determined on a basis of the amount of the characters rendered by using the alternative font data. In other words, alternative font rendering information to be rendered is different depending on the amount of the characters rendered by using the alternative font data. For example, if the amount of the characters rendered by using the alternative font data is equal to or larger than a threshold value, the alternative font identifier information is rendered in association with the position information as the alternative font rendering information as described in the aforementioned (2) and/or (3). Meanwhile, if the amount of the characters rendered by using the alternative font data is smaller than the threshold value, characters are rendered by using alternative font data with a rendering attribute different from the specified rendering attribute as the alternative font rendering information as described in the aforementioned (1).

(6) Alternative font rendering information to be rendered is determined on a basis of the amount of the characters rendered by using the alternative font data. In other words, alternative font rendering information to be rendered is different depending on the amount of the characters rendered by using the alternative font data. In contrast to the aforementioned (5), if the amount of the characters rendered by using the alternative font data is smaller than a threshold value, the alternative font identifier information is rendered in association with the position information as the alternative font rendering information as described in the aforementioned (2) and/or (3). Meanwhile, if the amount of the characters rendered by using the alternative font data is equal to or larger than the threshold value, characters are rendered by using alternative font data with a rendering attribute different from the specified rendering attribute as the alternative font rendering information as described in the aforementioned (1).

If a rendering attribute different from the specified rendering attribute is used as the alternative font rendering information (Step S105, YES), the character rendering module 111 of the rendering module 110 renders the characters by using the alternative font data with the different rendering attribute (for example, character color, background color, character surrounding) (Step S106).

Meanwhile, if a rendering attribute different from the specified rendering attribute is not used as the alternative font rendering information (Step S105, NO), the character rendering module 111 of the rendering module 110 renders the characters by using the alternative font data with the specified rendering attribute (Step S107).

If alternative font identifier information is to be rendered in association with position information as the alternative font rendering information (Step S108, YES), the alternative font information rendering module 112 of the rendering module 110 renders the alternative font identifier information (for example, the font name of the specified font, and the font name of the alternative font) in association with the position information (for example, near the characters, or page number of the page including the characters) (Step S109).

The rendering module 110 outputs the generated rendering data (bitmap data) to the video module 120.

6. Specific Example

The operational flow of the rendering module 110 will be described on a basis of the following specific example. The printable data includes the character codes specifying the characters "ABC" on the first line and the specified font "Arial" to be used to render the characters "ABC", and the character codes specifying the characters "ABC" on the second line and the specified font "New York" to be used to render the characters "ABC".

With reference to FIG. 3, the character rendering module 111 of the rendering module 110 determines that the specified font "Arial" is included in the list 200 (Step S101, YES). In this case, the character rendering module 111 of the rendering module 110 renders the characters "ABC" specified by the character codes included in the printable data by using the specified font "Arial" (Step S102).

Meanwhile, the character rendering module 111 of the rendering module 110 determines that the specified font "New York" is not included in the list 200 (Step S101, NO). In this case, the character rendering module 111 of the rendering module 110 selects one alternative font "Courier" out of the one or more fonts included in the list 200 (Step S103).

With reference to the alternative font setting information 300, the character rendering module 111 of the rendering module 110 determines alternative font rendering information to be rendered (Step S104).

If a rendering attribute different from the specified rendering attribute is used as the alternative font rendering information (Step S105, YES), the character rendering module 111 of the rendering module 110 renders the characters by using the alternative font data with the different rendering attribute (for example, character color, background color, character surrounding) (Step S106).

FIG. 4 shows examples of alternative font rendering information that is rendered.

For example, the character rendering module 111 of the rendering module 110 renders the characters 210 by using the alternative font data of the alternative font "Courier" with the different rendering attribute (character color) as the alternative font rendering information. For example, the character rendering module 111 of the rendering module 110 renders the characters 220 by using the alternative font data of the alternative font "Courier" with the different rendering attribute (background color) as the alternative font rendering information. For example, the character rendering module 111 of the rendering module 110 renders the characters 230 by using the alternative font data of the alternative font "Courier" with the different rendering attribute (character surrounding) as the alternative font rendering information.

Meanwhile, if a rendering attribute different from the specified rendering attribute is not used as the alternative font rendering information (Step S105, NO), the character rendering module 111 of the rendering module 110 renders the characters 240 or 250 by using the alternative font data with the specified rendering attribute (Step S107).

If alternative font identifier information is to be rendered in association with position information as the alternative font rendering information (Step S108, YES), the alternative font information rendering module 112 of the rendering module 110 renders the alternative font identifier information (for example, the font name of the specified font, and the font name of the alternative font: "New York—Courier") in association with the position information (for example, near the characters, or page number of the page including the characters) (Step S109).

For example, the alternative font information rendering module 112 of the rendering module 110 renders the alternative font identifier information (for example, the font name of the specified font, and the font name of the alternative font: "New York—Courier") 241 in association with the position information (for example, near the characters 240) (Step S109). For example, the alternative font information rendering module 112 of the rendering module 110 renders the alternative font identifier information (for example, the font name of the specified font, and the font name of the alternative font: "New York—Courier") 251 in association with the position information (for example, page number 252 of the page including the characters) (Step S109).

7. Conclusion (1) According to the present embodiment, the rendering module 110 is configured to, if the specified font is not included in the list, the specified font being a font specified by the font specifying information (Step S101, NO), render characters by using an alternative font (Step S106 or S107). As a result, the image forming apparatus 10 is capable of rendering characters by using an alternative font even if it is actually not possible to render those characters by using the specified font because the image forming apparatus 10 does not have the specified font. The rendering module 110 renders alternative font rendering information when an alternative font is used. As a result, a user may easily and reliably know that the alternative font is used.

If characters are rendered by using an alternative font, it is difficult for a user to know, only by reading the resultant print, whether or not an alternative font is used, which characters are rendered by using an alternative font, or which alternative font is used instead of which font. For example, according to a conceivable idea, in order for a user to know that an alternative font is to be used, a preview image is displayed on a display device (touch panel) of an image forming apparatus before forming an image (i.e., before printing). However, if utility software is not used for printing but a file such as a PDF file is sent directly to an image forming apparatus via a network or the like by using File Transfer Protocol (FTP) or the like, the image forming apparatus may not use a preview function. Further, in the process of developing an image forming apparatus or software to be updated, for example, large amount of print data is sometimes sent to the image forming apparatus in order to evaluate the output result output from the image forming apparatus. In this case, a creator or another person refers to preview images and confirms whether or not an alternative font is used and which characters are rendered by using an alternative font before every printing, which is burdensome. To the contrary, according to the present embodiment, if an alternative font is used, the fact that the alternative font is used is described in resultant print. As a result, a user may easily and reliably know that the alternative font is used.

(2) According to the present embodiment, the rendering module 110 may be further configured to render, as the alternative font rendering information, the character by using the alternative font data with a rendering attribute (for example, character color, background color, character surrounding) different from a specified rendering attribute, the specified rendering attribute being the rendering attribute included in the printable data (Step S106). The rendering attribute of the character rendered by using the alternative font data is different from the rendering attribute of the character rendered by not using the alternative font data. As a result, a user may visually, easily, and reliably know that the alternative font is used.

(3) and (6) According to the present embodiment, the rendering module 110 may be further configured to render, as the alternative font rendering information, alternative font identifier information in association with position information, the position information being information indicating a position of the character rendered by using the alternative font data (Step S109). As a result, also when the rendering attribute of the character rendered by using the alternative font data is different from the rendering attribute of the character rendered by not using the alternative font data (Step S107), a user may visually, easily, and reliably know the position of the character rendered by the alternative font data and the used alternative font.

(4) According to the present embodiment, the rendering module 110 may be further configured to render the alternative font identifier information near the character rendered by using the alternative font data as the position information (Step S109). As a result, a user may visually, easily, and reliably know the character rendered by the alternative font data and the used alternative font.

(5) According to the present embodiment, the rendering module 110 may be further configured to generate a page image including the alternative font identifier information and character information indicating the position of the character as the position information, and render the page image (Step S109). As a result, the positions of all the characters rendered by using the alternative font and the used alternative font are described on one page image. As a result, for example, even if print data has many pages or an alternative font is used at a plurality of positions, a user may visually, easily, and reliably know the character rendered by the alternative font data and the used alternative font.

(7) According to the present embodiment, the rendering module 110 may be further configured to determine the alternative font rendering information to be rendered on a basis of an amount of characters rendered by using the alternative font data (Step S104). As a result, a user may know that an alternative font is used by means of an appropriate method depending on the amount of characters rendered by the alternative font data.

(8) According to the present embodiment, the rendering module 110 may be configured to, if the amount of the characters rendered by using the alternative font data is equal to or larger than a threshold value, render, as the alternative font rendering information, alternative font identifier information in association with position information, the position information being information indicating a position of the character rendered by using the alternative font data (Step S109). For example, if a relatively large amount of characters are rendered by using alternative font data with a different rendering attribute, readability of the characters for a user may possibly be low (for example, because characters are rendered with character color, background color, or character surrounding). Instead, it may be difficult for a user to know that an alternative font is used (although a different rendering attribute is used for a large amount of characters, the rendering attribute is rather not outstanding since the amount of the characters is large). To the contrary, according to the present embodiment, the alternative font identifier information is rendered in association with the position information. As a result, a user may visually, easily, and reliably know the position of the characters rendered by the alternative font data and the used alternative font.

According to the present embodiment, the rendering module 110 may be configured to, if the amount of the characters rendered by using the alternative font data is smaller than the threshold value, render, as the alternative font rendering information, the character by using the alternative font data with a rendering attribute different from the specified rendering attribute (Step S106). As a result, if a relatively small amount of characters are rendered by using alternative font data, readability of the characters for a user may not be low (for example, because characters are rendered with character color, background color, or character surrounding) depending on the rendering attribute as a result of rendering the characters with the different rendering attribute. In addition, it may be easy for a user to know that an alternative font is used (because a different rendering attribute is used for a small amount of characters, the rendering attribute is outstanding). As a result, a user may visually, easily, and reliably know the characters rendered by the alternative font data.

(9) To the contrary, according to the present embodiment, the rendering module 110 may be configured to, if the amount of the characters rendered by using the alternative font data is smaller than a threshold value, render, as the alternative font rendering information, alternative font identifier information in association with position information, the alternative font identifier information being information identifying the alternative font, the position information being information indicating a position of the character rendered by using the alternative font data (Step S109). As a result, for example, if the amount of print data is large and a relatively small amount of characters are rendered with alternative font data, even if the characters are rendered with a different rendering attribute, the characters rendered with the alternative font data are obscured by other data. As a result, it may be difficult for a user to find the characters rendered with the different rendering attribute. To the contrary, according to the present embodiment, the alternative font identifier information is rendered in association with the position information. As a result, a user may visually, easily, and reliably know the position of the characters rendered by the alternative font data and the used alternative font.

According to the present embodiment, the rendering module 110 may be configured to, if the amount of the characters rendered by using the alternative font data is equal to or larger than the threshold value, render, as the alternative font rendering information, the character by using the alternative font data with a rendering attribute different from the specified rendering attribute (Step S106). If a relatively large amount of characters are rendered by using the alternative font data with the different rendering attribute, it is expected that a user will easily find the characters rendered by using the alternative font data at first sight depending on the rendering attribute. As a result, a user may visually, easily, and reliably know the characters rendered by the alternative font data.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
a memory configured to store font data of each of one or more fonts, and a list including the one or more fonts;
a communication interface configured to receive printable data from a host device, the printable data including font specifying information and a character code; and
a controller circuit configured to execute an information processing program to operate as a rendering module, the rendering module being configured to
determine whether or not a specified font is included in the list, the specified font being a font specified by the font specifying information,
if determining that the specified font is not included in the list,
select any one alternative font from the list, the alternative font being one of the one or more fonts,
determine alternative font rendering information to be rendered,
render a character specified by the character code included in the printable data by using alternative font data by using the determined alternative font rendering information, the alternative font data being font data of the alternative font, and
render alternative font rendering information, the alternative font rendering information being information indicating that rendering is executed by using the alternative font data, the alternative font rendering information being alternative font identifier information in association with position information if the alternative font identifier information is to be rendered in association with the position information, the alternative font identifier information being information identifying the alternative font, the position information being information indicating a position of the character rendered by using the alternative font data.

2. The image forming apparatus according to claim 1, wherein
the printable data further includes a rendering attribute, and
the rendering module is further configured to render, as the alternative font rendering information, the character by using the alternative font data with a rendering attribute different from a specified rendering attribute, the specified rendering attribute being the rendering attribute included in the printable data.

3. The image forming apparatus according to claim 1, wherein
the rendering module is further configured to render the alternative font identifier information near the character rendered by using the alternative font data as the position information.

4. The image forming apparatus according to claim 1, wherein
the rendering module is further configured to
generate a page image including the alternative font identifier information and character information indicating the position of the character as the position information, and
render the page image.

5. The image forming apparatus according to claim 2, wherein
the rendering module is further configured to render, as the alternative font rendering information, alternative font identifier information in association with position information, the alternative font identifier information being information identifying the alternative font, the position information being information indicating a position of the character rendered by using the alternative font data.

6. The image forming apparatus according to claim 1, wherein
the rendering module is further configured to determine the alternative font rendering information to be rendered on a basis of an amount of characters rendered by using the alternative font data.

7. The image forming apparatus according to claim 6, wherein
the rendering module is configured to
if the amount of the characters rendered by using the alternative font data is equal to or larger than a threshold value, render, as the alternative font rendering information, alternative font identifier information in association with position information, the alternative font identifier information being information identifying the alternative font, the position information being information indicating a position of the character rendered by using the alternative font data, and
if the amount of the characters rendered by using the alternative font data is smaller than the threshold value, render, as the alternative font rendering information, the character by using the alternative font data with a rendering attribute different from the specified rendering attribute.

8. The image forming apparatus according to claim 6, wherein
the rendering module is configured to
if the amount of the characters rendered by using the alternative font data is smaller than a threshold value, render, as the alternative font rendering information, alternative font identifier information in association with position information, the alternative font identifier information being information identifying the alternative font, the position information being information indicating a position of the character rendered by using the alternative font data, and
if the amount of the characters rendered by using the alternative font data is equal to or larger than the threshold value, render, as the alternative font rendering information, the character by using the alternative font data with a rendering attribute different from the specified rendering attribute.

9. An image forming method for an image forming apparatus including
a memory configured to store font data of each of one or more fonts, and a list including the one or more fonts,
a communication interface configured to receive printable data from a host device, the printable data including font specifying information and a character code, and
a controller circuit configured to execute an information processing program to operate as a rendering module,
the image forming method comprising:
by the rendering module of the image forming apparatus,
determining whether or not a specified font is included in the list, the specified font being a font specified by the font specifying information;
if determining that the specified font is not included in the list,
selecting any one alternative font from the list, the alternative font being one of the one or more fonts;
determining alternative font rendering information to be rendered,
rendering a character specified by the character code included in the printable data by using alternative font data by using the determined alternative font rendering information, the alternative font data being font data of the alternative font; and
rendering alternative font rendering information, the alternative font rendering information being information indicating that rendering is executed by using the alternative font data, the alternative font rendering information being alternative font identifier information in association with position information if the alternative font identifier information is to be rendered in association with the position information, the alternative font identifier information being information identifying the alternative font, the position information being information indicating a position of the character rendered by using the alternative font data.

10. The image forming method according to claim 9, further comprising:
the printable data further including a rendering attribute,
by the rendering module, rendering, as the alternative font rendering information, the character by using the alternative font data with a rendering attribute different from a specified rendering attribute, the specified rendering attribute being the rendering attribute included in the printable data.

11. The image forming method according to claim 10, further comprising:
by the rendering module, rendering, as the alternative font rendering information, alternative font identifier information in association with position information, the alternative font identifier information being information identifying the alternative font, the position information being information indicating a position of the character rendered by using the alternative font data.

12. The image forming method according to claim 9, further comprising:
by the rendering module, determining the alternative font rendering information to be rendered on a basis of an amount of characters rendered by using the alternative font data.

13. A non-transitory computer readable recording medium that records an information processing program executable by an image forming apparatus including
a memory configured to store font data of each of one or more fonts, and a list including the one or more fonts,
a communication interface configured to receive printable data from a host device, the printable data including font specifying information and a character code, and
a controller circuit configured to execute an information processing program to operate as a rendering module,
the information processing program causing the controller circuit of the image forming apparatus to operate as a rendering module,
the rendering module being configured to
determine whether or not a specified font is included in the list, the specified font being a font specified by the font specifying information,
if determining that the specified font is not included in the list,
select any one alternative font from the list, the alternative font being one of the one or more fonts,
determine alternative font rendering information to be rendered,
render a character specified by the character code included in the printable data by using alternative font data by using the determined alternative font rendering information, the alternative font data being font data of the alternative font, and render, as alternative font rendering information, the alternative font rendering information being information indicating that rendering is executed by using the alternative font data, the alternative font rendering information being alternative font identifier information in association with position information if the alternative font identifier information is to be rendered in association with the position information, the alternative font identifier information being information identifying the alternative font, the position information being information indicating a position of the character rendered by using the alternative font data.

14. The non-transitory computer readable recording medium according to claim 13, wherein the printable data further includes a rendering attribute, and the rendering module is further configured to render, as the alternative font rendering information, the character by using the alternative font data with a rendering attribute different from a specified rendering attribute, the specified rendering attribute being the rendering attribute included in the printable data.

15. The non-transitory computer readable recording medium according to claim 14, wherein the rendering module is further configured to render, as the alternative font rendering information, alternative font identifier information in association with position information, the alternative font identifier information being information identifying the alternative font, the position information being information indicating a position of the character rendered by using the alternative font data.

16. The non-transitory computer readable recording medium according to claim 13, wherein the rendering module is further configured to determine the alternative font rendering information to be rendered on a basis of an amount of characters rendered by using the alternative font data.

\* \* \* \* \*